(12) United States Patent
Sheu et al.

(10) Patent No.: US 8,238,507 B2
(45) Date of Patent: Aug. 7, 2012

(54) TRANSMISSION ARCHITECTURE OF TRANSMITTER

(75) Inventors: Chorng-Ren Sheu, Kaohsiung (TW); Ming-Chien Tseng, Kaohsiung County (TW); Ching-Yung Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 885 days.

(21) Appl. No.: 12/131,930

(22) Filed: Jun. 3, 2008

(65) Prior Publication Data

US 2009/0225895 A1 Sep. 10, 2009

(30) Foreign Application Priority Data

Mar. 4, 2008 (TW) ................................ 97107500 A (51) Int. Cl.
*H04L 27/00* (2006.01)
(52) U.S. Cl. ........................................ 375/376; 375/295
(58) Field of Classification Search .................. 370/344, 370/208, 204, 465
See application file for complete search history.

(56) References Cited

U.S. PATENT DOCUMENTS

| | | | |
|---|---|---|---|
| 5,008,937 A * | 4/1991 | Yamamura et al. | 380/252 |
| 5,425,050 A * | 6/1995 | Schreiber et al. | 375/141 |
| 6,512,758 B1 | 1/2003 | Sato et al. | 370/344 |
| 7,020,185 B1 * | 3/2006 | Balachandran et al. | 375/219 |
| 7,277,498 B2 | 10/2007 | Hanaoka et al. | |
| 7,280,467 B2 | 10/2007 | Smee et al. | |
| 2002/0172184 A1 * | 11/2002 | Kim et al. | 370/344 |
| 2006/0184862 A1 | 8/2006 | Kim et al. | |
| 2008/0165617 A1 * | 7/2008 | Abbot et al. | 367/3 |
| 2008/0165671 A1 * | 7/2008 | Larsson | 370/204 |
| 2009/0052504 A1 * | 2/2009 | Tanae | 375/149 |
| 2009/0209264 A1 * | 8/2009 | Yang et al. | 455/452.1 |

FOREIGN PATENT DOCUMENTS

| | | |
|---|---|---|
| EP | 1679849 | 7/2006 |
| EP | 1681822 | 7/2006 |
| EP | 1855406 | 11/2007 |
| WO | 2006068543 | 6/2006 |
| WO | WO 2006068543 A1 * | 6/2006 |
| WO | WO 2006112179 A1 * | 10/2006 |
| WO | 2007/080678 | 7/2007 |

OTHER PUBLICATIONS

Article titled "OFDM with reduced peak-to-average power ratio by optimum combination of partial transmit sequences" authored by Muller et al., Electronics Letters Feb. 27, 1997 vol. 33 No. 5, pp. 368-369.

(Continued)

*Primary Examiner* — David C. Payne
*Assistant Examiner* — Wednel Cadeau
(74) *Attorney, Agent, or Firm* — Jianq Chyun IP Office (57) ABSTRACT

This invention provides a transmission architecture of transmitter which includes a forestage module, a pilot insertion, a scramble selector, and a backstage module. A frequency domain data symbol is transmitted by the forestage module. A pilot signal is inserted in the frequency domain data symbol by the pilot insertion, and a frequency domain pilot symbol is produced. The frequency domain pilot symbol performed a scramble operation and a select operation with certain scramble patterns by the scramble selector, and a requirement symbol is produced. The requirement symbol is converted into the transmitted signal by the backstage module. Because the use of the scramble operation and the select operation from the scramble selector, the transmission architecture of transmitter provided by this invention can both reduce the PAPR and increase the multi-cell diversity gain in an OFDM single frequency network system.

18 Claims, 7 Drawing Sheets

OTHER PUBLICATIONS

Article titled "Further Study on Reference Signal Structure for MBMS" TSG-RAN WGI #45, Shanghai, China, May 8-12, 2006, pp. 1-8.
Article titled "OFDM with reduced peak-to-average power ratio by optimum combination of partial transmit sequences" authored by Muller et al., Electronics Letters Feb. 27, 1997 vol. 33 No. 5 pp. 368-369.
"Office Action of Taiwan Counterpart Application", issued on Jun. 30, 2011, p. 1-p. 9.
"Search Report of European Counterpart Application", issued on Dec. 21, 2011, p. 1-p. 8.
Garcia et al., "Joint Channel Estimation and Peak-to-Average Power Reduction in Coherent OFDM: A Novel Approach", Vehicular Technology Conference, May 6, 2001, pp. 815-819.

* cited by examiner

TRANSMISSION ARCHITECTURE OF TRANSMITTER

CROSS-REFERENCE TO RELATED APPLICATION

This application claims the priority benefit of Taiwan application serial no. 97107500, filed on Mar. 4, 2008. The entirety of the above-mentioned patent application is hereby incorporated by reference herein and made a part of this specification.

BACKGROUND OF THE INVENTION

1. Field of the Invention

The present invention generally relates to a transmitter, and more particularly, to a transmission architecture of a transmitter.

2. Description of Related Art

A transmitter in the digital communication and broadcasting system transmits an information signal to a receiver through a channel in the form of electromagnetic waves. However, due to undesirable channel effects like multi-path reflection and signal attenuation, the received signal may be distorted. If there is a long time interval between the received multi-path signals, the delay spread may be enlarged. Meanwhile, the reciprocal value of the delay spread is approximate to a coherent bandwidth, and the channel frequency response thereof may cause a frequency-selective fading effect. In the orthogonal frequency division multiplexing (OFDM) transmission technology of multi-carrier modulation, a guard interval (GI) is usually added at the front end of an effective symbol for counteracting the multi-path channel effect, so as to alleviate or avoid the intersymbol interference (ISI) impacts for the transmitted signals. Therefore, since the OFDM transmission technology based upon multi-carrier modulation is capable of effectively processing the multi-path channel effect, it has gradually become a mainstream technology in the applications of wired/wireless communication and digital broadcasting in recent years.

The network construction of the OFDM system can be classified into multi-frequency network (MFN) and single frequency network (SFN). The SFN has the following three apparent advantages. First, the SFN merely requires a small power but provides many distribution points, and thus covering a wide range. Second, the SFN saves frequency resources, that's because the whole system only requires one frequency. Third, when a user moves within the coverage area, the receiver in operation need not change the frequency. Therefore, most of the systems employ the SFN architecture to completely use the allocated frequency bands. The OFDM systems adopting the SFN architecture include digital video broadcasting-terrestrial (DVB-T), digital video broadcasting-handheld (DVB-H), digital audio broadcasting (DAB), terrestrial digital multimedia television broadcasting (DMB-T), and multimedia forward link only (FLO).

Besides the characteristic of counteracting the multi-path channel effect, the OFDM system further has the functions of channel encoding and signal interleaving, such that the consecutive errors caused by the channel effect during the transmission process can be eliminated, and when receiving signals, the error bits are corrected with correct ones based on the channel decoding and signal de-interleaving technology. However, in order to more effectively correct the error bits, besides the functions of channel encoding and signal interleaving, the channel frequency response must be diversified, such that when the signal received by the receiver becomes an error signal after passing through a part of the channels with relatively poor frequency response, the error signal can be corrected according to a correct signal generated through a part of the channels with desirable frequency response.

To ensure the diversity of the channel frequency response, the transmitter in the OFDM system is usually accomplished by a diversity transmission technique or the receiver is accomplished by a diversity receiving technique. The diversity gain generated by the diversity technology may enhance the receiving performance of the receiver.

During the usage and system building of the SFN, though the coverage area is quite large, on the boundary between the signal coverage areas of two transmitters in the SFN, the receiver may simultaneously receive identical transmitted signals from the two areas. Under such a channel environment with extremely small delay spread, the coherent bandwidth is a wideband coherent bandwidth having rather slow changes in the channel frequency response, so as to generate a flat fading channel response. At this time, if the channel frequency responses on the boundary of the signal coverage areas of the two adjacent transmitters in the SFN make the signals have inverted phases, destructive interference may occur to the whole channel frequency responses, and channel frequency responses may have a rather low energy. Further, if the fading coherent time lasts too long due to the shadow effect, the OFDM transmission technology may not show its advantage in counteracting the multi-path channel effect. Besides, even if the OFDM transmission technology has the functions of channel encoding and signal interleaving, it still cannot correct the error signal generated by the poor channel frequency response with the correct ones generated by the desirable channel frequency response under the circumstances that the channel frequency response has a too low energy and the fading coherent time is extremely long. Therefore, it has become a key point in the design of transmitter about how to process signals in the transmitter with diversity technology without affecting the original system performance of the SFN or altering the original design of the receiver.

The paper, entitled "*R1-061264: Further Studio on Reference Signal Structure for MBMS*" (3GPP LTE RAN1 meeting document, May 12, 2006), issued by Toshiba Corp. and NTT DoCoMo discloses that, in the transmitter for each cell of the SFN, the OFDM system can utilize different scramble parameters to encode sub-carriers in various different groups, such that the receiver may generate a diversified channel frequency response upon receiving a synthesized signal of the two transmitters on the boundary of the areas. Further, with the additional functions of channel encoding and signal interleaving, a multi-cell diversity gain is obtained. Therefore, the above technique can eliminate the disadvantage that the channel frequency response on the cell boundary has too low energy. In addition, the technique need not particularly modify the original design of the receiver, which does not increase the cost on improving the system performance.

In addition, as the OFDM system adopts the multi-carrier modulation technique, the transmitted signals may have excessive large peak-to-average power ratios (PAPRs). As a result, nonlinear distortion of signals may occur when being transmitted through a power amplifier, that is, some transmitted signals with relatively large power may be clipped. Therefore, it is also a key point in the design of the transmitter as to how to reduce the PAPRs of the signals transmitted by the transmitter.

The paper, entitled "*OFDM with Reduced Peak-to-average Power Ratio by Optimum Combination of Partial Transmit Sequences*", (Electronics Letters, vol. 33, no. 5, pp. 368-369, February 1997) issued by S. H. Muller and J. B. Huber discloses a PAPR reduction method. First, each OFDM symbol (X) of a transmitted signal with a length of N samples is divided into M symbols ($X_1, X_2, \ldots, X_M$). In each of the symbols, only an individual part of the sub-carriers are assigned with values, and the others are zero. Each of such symbols goes through inverse discrete Fourier transformation with a length of N points and then they are respectively multiplied by a set of coefficients ($b_1, b_2, \ldots, b_M$). Afterwards, these products are summed up to calculate a PAPR of the summed signal. As for the same OFDM symbol (X), different sets of coefficients are used for producing different corresponding summed signals, so as to calculate a plurality of corresponding PAPRs, and then the set of coefficients corresponding to the minimum PAPR is determined. Finally, the set of coefficients and the corresponding summed signal are output. Additionally, as the set of coefficients are designed as random coefficients, they may cause difficulties in the channel estimation of the receiver if being combined with the channel effect. In order to prevent the channel estimation from being affected by the set of coefficients, the known reference signal (for example, a pilot signal) for estimating the channel frequency response is generally not processed by the set of coefficients. Therefore, the receiver needs a side information and a safer channel to transmit the side information. The side information is used for informing the receiver about the set of coefficients, so as to facilitate the receiver to restore the original OFDM symbol (X).

In view of the above, the conventional transmitter has been improved by enhancing the multi-cell diversity gain, or by reducing the PAPR. However, if the two problems occur in the transmitter at the same time, a transmitter capable of both enhancing the multi-cell diversity gain and reducing the PAPR is required.

SUMMARY OF THE INVENTION

Accordingly, the present invention is directed to a transmission architecture of a transmitter.

The present invention provides a transmission architecture of a transmitter. An exemplary example of the above-mentioned transmission architecture of a transmitter consistent with the invention includes a forestage module, a pilot insertion, a scramble selector, and a backstage module. The forestage module is used for transmitting a frequency domain data symbol. The pilot insertion is coupled to the forestage module and used for receiving the frequency domain data symbol and inserting a pilot signal in the frequency domain data symbol to produce a frequency domain pilot symbol. The scramble selector is coupled to the pilot insertion and is used for generating a plurality of scramble patterns used to perform a scramble operation with the frequency domain pilot symbol, and then performing a select operation to produce a requirement symbol. The backstage module is coupled to the scramble selector and is used for processing and transmitting the requirement symbol out of the transmitter.

In view of the above, according to the embodiment of the present invention, the pilot insertion first inserts a pilot signal in the frequency domain data symbol to generate a frequency domain pilot symbol and then transmits the frequency domain pilot symbol to the scramble selector. Hence, when the receiver estimates the channel frequency response, the channel frequency response estimated through using the pilot signal further includes the effect of the scramble patterns. As such, in the OFDM system of the single frequency network or other communication networks, there is no need to allocate another safe channel to provide side information containing the scramble pattern information to the receiver. Therefore, with the transmitter adopting the transmission architecture of the present invention, the original receiver need not be changed at all.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

In order to make the present invention more comprehensible, an OFDM system of the SFN is taken as an application example for the present invention, and the transmission architecture of a transmitter provided by the present invention will be illustrated below through the embodiments of the present invention with reference to the accompanying drawings.

Figure 1:
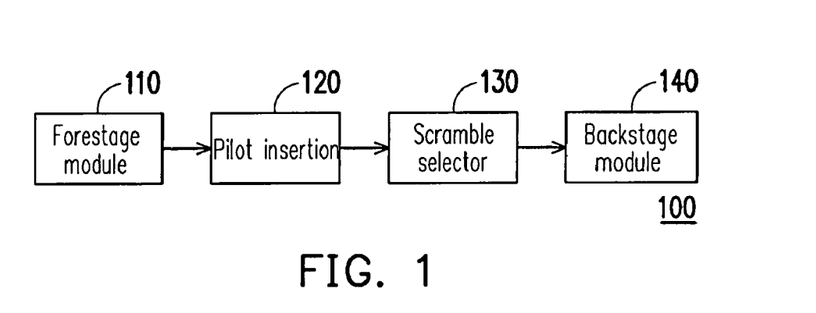
FIG. 1 is a system block diagram of a transmission architecture of a transmitter according to an exemplary embodiment consistent of the present invention.

FIG. 1 is a system block diagram of a transmission architecture of a transmitter 100 according to an exemplary embodiment consistent of the present invention. The transmission architecture includes a forestage module 110, a pilot insertion 120, a scramble selector 130, and a backstage module 140.

Figure 2:
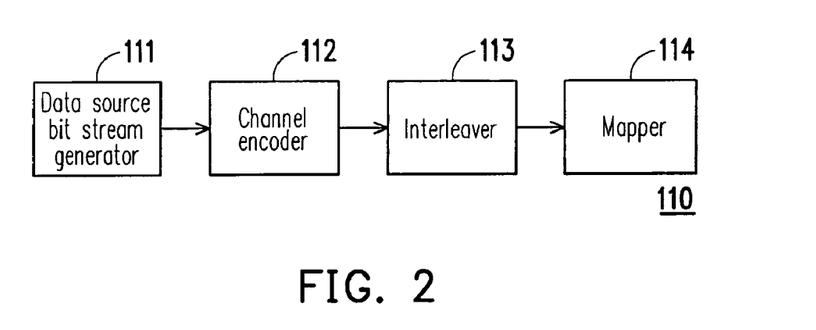
FIG. 2 is a circuit block diagram of a forestage module in FIG. 1.

Referring to FIG. 2, the forestage module 110 further includes a data source bit stream generator 111, a channel encoder 112, an interleaver 113, and a mapper 114. The data source bit stream generator 111 generates a frequency domain data bit stream to be transmitted. The channel encoder 112 is coupled to the data source bit stream generator 111 and is used for receiving the frequency domain data bit stream provided by the data source bit stream generator 111, and performing channel encoding on the frequency domain data bit stream. The interleaver 113 is coupled to the channel encoder 112 and is used for receiving the encoded frequency domain data bit stream, and performing interleaving on the encoded frequency domain data bit stream. The mapper 114 is coupled to the interleaver 113 and is used for mapping the interleaved encoded frequency domain data bit stream into the frequency domain data symbol, and then transmitting the frequency domain data symbol to the pilot insertion 120. The mapper 114 may be a 16-stage quadrature amplitude modulator and may be used for performing a 16-stage quadrature amplitude modulation (16-QAM) mapping on the interleaved encoded frequency domain data bit stream to produce a frequency domain data symbol, and the 16-stage quadrature amplitude modulator may also be substituted by other mappers.

Referring to FIG. 1, the pilot insertion 120 is coupled to the forestage module 110 and is used for receiving the frequency domain data symbol transmitted by the forestage module 110, and inserting a pilot signal in the frequency domain data symbol to produce a frequency domain pilot symbol. The pilot signal for being inserted is a known reference signal for estimating a channel effect.

The scramble selector 130 is coupled to the pilot insertion 120 and may include a scrambler 131 and a selector 132. A plurality of scramble patterns generated in the scrambler 131 are used to perform a scramble operation with the frequency domain pilot symbol, and then a plurality of scramble symbols are produced and sent into a selector. Afterwards, a select operation is performed to produce a requirement symbol in the selector 132. The scramble operation performed between the scramble patterns and the frequency domain pilot symbol may be a multiply operation, or a combination of a multiply operation and an inverse fast Fourier transformation operation. The implementation of the scramble operation is not intended to limit the present invention. Furthermore, the condition for selecting the requirement symbol may be a time domain scramble symbol with a relative minimum PAPR, which is not intended to limit the present invention.

Figure 3A:
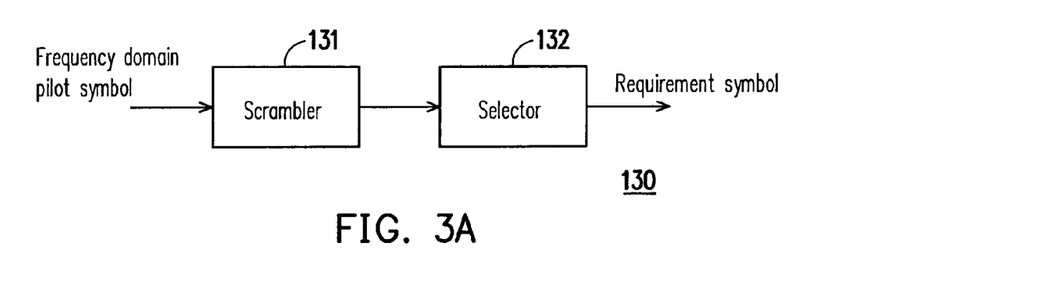
FIG. 3A is a circuit block diagram of a scramble selector in FIG. 1.
Figure 3B:
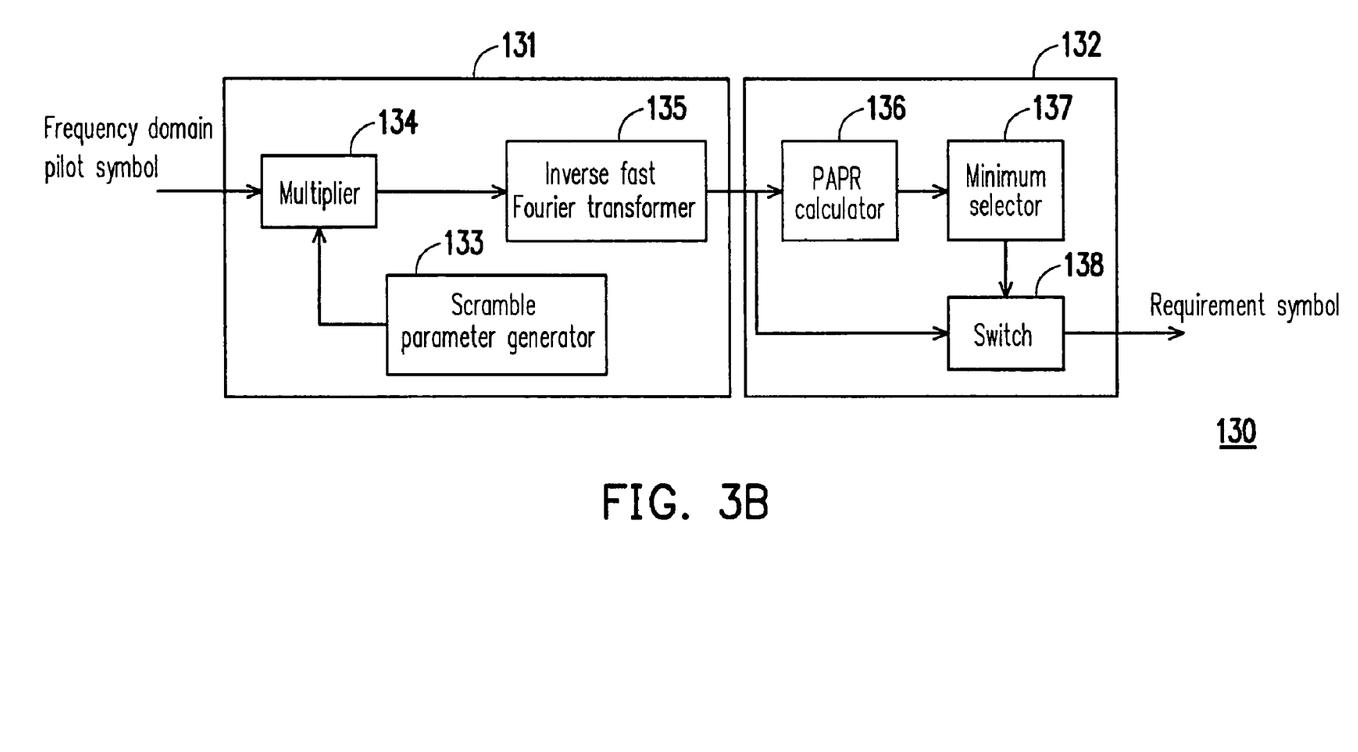
FIG. 3B is a circuit block diagram of a scrambler and a selector in FIG. 3A.

It should be noted that, the scramble selector 130 includes the scrambler 131 and the selector 132, as shown in FIG. 3A, and the operations of the scrambler 131 and the selector 132 may be obtained with reference to FIG. 3B. The scrambler 131 is coupled to the pilot insertion 120, and the selector 132 is coupled between the scrambler 131 and the backstage module 140. The scrambler 131 includes a scramble parameter generator 133, a multiplier 134, and an inverse fast Fourier transformer 135. The scrambler 131 receives the frequency domain pilot symbol ($\underline{X}=\{X_k, k=0, 1, \ldots, N-1\}$, in which $\underline{X}$ is a frequency domain pilot symbol, and $X_k$ is the sample at the $k^{th}$ sub-carrier in the frequency domain pilot symbol). In this embodiment, the scramble parameter generator 133 generates a plurality of scramble patterns ($\underline{b}(j)=\{b_k^{(j)}, k=0, 1, \ldots, N-1\}, j=1, 2, \ldots, N_p$, in which $\underline{b}(j)$ is the $j^{th}$ scramble pattern, $b_k^{(j)}$ is the $k^{th}$ scramble parameter in the $j^{th}$ scramble pattern, and there are totally $N_p$ scramble patterns). The multiplier 134 multiplies the scramble patterns with the frequency domain pilot symbol to produce a plurality of frequency domain scramble symbols. The inverse fast Fourier transformer 135 is coupled to the multiplier 134 and is used for converting the frequency domain scramble symbols into the corresponding time domain scramble symbols. The multiply operation is shown as follows:

$$\underline{X}'^{(j)}=\{X_k'^{(j)}=X_k \cdot b_k^{(j)}, k=0, 1, \ldots, N-1\}, j=1, 2, \ldots, N_p,$$

wherein $\underline{X}'^{(j)}$ is the $j^{th}$ frequency domain scramble symbol, $X_k'^{(j)}$ is the sample at the $k^{th}$ sub-carrier in the $j^{th}$ frequency domain scramble symbol, and there are totally $N_p$ frequency domain scramble symbols. The inverse fast Fourier transformation operation is shown as follows:

$$x_n'^{(j)} = \frac{1}{N}\sum_{k=0}^{N-1} X_k'^{(j)} \cdot e^{j\frac{2\pi nk}{N}} \text{ where}$$

$$n = 0, 1, \ldots, N-1 \text{ and } j = 1, 2, \ldots, N_p,$$

$$\underline{x}'^{(j)} = \{x_n'^{(j)}, n = 0, 1, \ldots, N-1\}, j = 1, 2, \ldots, N_p,$$

wherein $\underline{x}'^{(j)}$ is the $j^{th}$ time domain scramble symbol, $x_n'^{(j)}$ is the $n^{th}$ sample in the $j^{th}$ time domain scramble symbol, and there are totally $N_p$ time domain scramble symbols.

The selector 132 includes a PAPR calculator 136, a minimum selector 137, and a switch 138.

The PAPR calculator 136 is coupled to the inverse fast Fourier transformer 135 and is used for calculating the PAPRs of the time domain scramble symbols through the following formula:

$$PAPR^{(j)} = \frac{\max_{0 \leq n \leq N-1} |x_n'^{(j)}|^2}{E[|x_n'^{(j)}|^2]}, j = 1, 2, \ldots, N_p,$$

wherein $\max_{0 \leq n \leq N-1} |x_n'^{(j)}|^2$ is the peak power of the $j^{th}$ time domain scramble symbol, $E[|x_n'^{(j)}|^2]$ is the average power of the $j^{th}$ time domain scramble symbol, and $PAPR^{(j)}$ is the PAPR of the $j^{th}$ time domain scramble symbol, and there are totally $N_p$ PAPRs.

The minimum selector 137 is coupled to the PAPR calculator 136 and is used for selecting a minimum PAPR from the output of the PAPR calculator 136, and informing the switch 138 about the index number of the scramble pattern corresponding to the minimum PAPR. The operation formula is shown as follows:

$$j_{opt}=\arg\{\min_{1 \leq j \leq N_p} PAPR^{(j)}\},$$

wherein $j_{opt}$ is the index number of the scramble pattern corresponding to the minimum PAPR calculated and selected from the total $N_p$ time domain scramble symbols.

The switch 138 is provided with a register memory therein and is used for storing the plurality of time domain scramble symbols ($\underline{x}'^{(j)}=\{x_n'^{(j)}, n=0, 1, \ldots, N-1\}, j=1, 2, \ldots N_p$). Upon being controlled by the minimum selector 137, the switch 138 selects one of the time domain scramble symbols to be transmitted to the backstage module 140. In other words, under the control of the minimum selector 137, the switch 138 sets the time domain scramble symbol ($\underline{x}'^{(j_{opt})}$) with the minimum PAPR stored in the register as the requirement symbol, and transmits the requirement symbol to the backstage module 140.

Figure 3C:
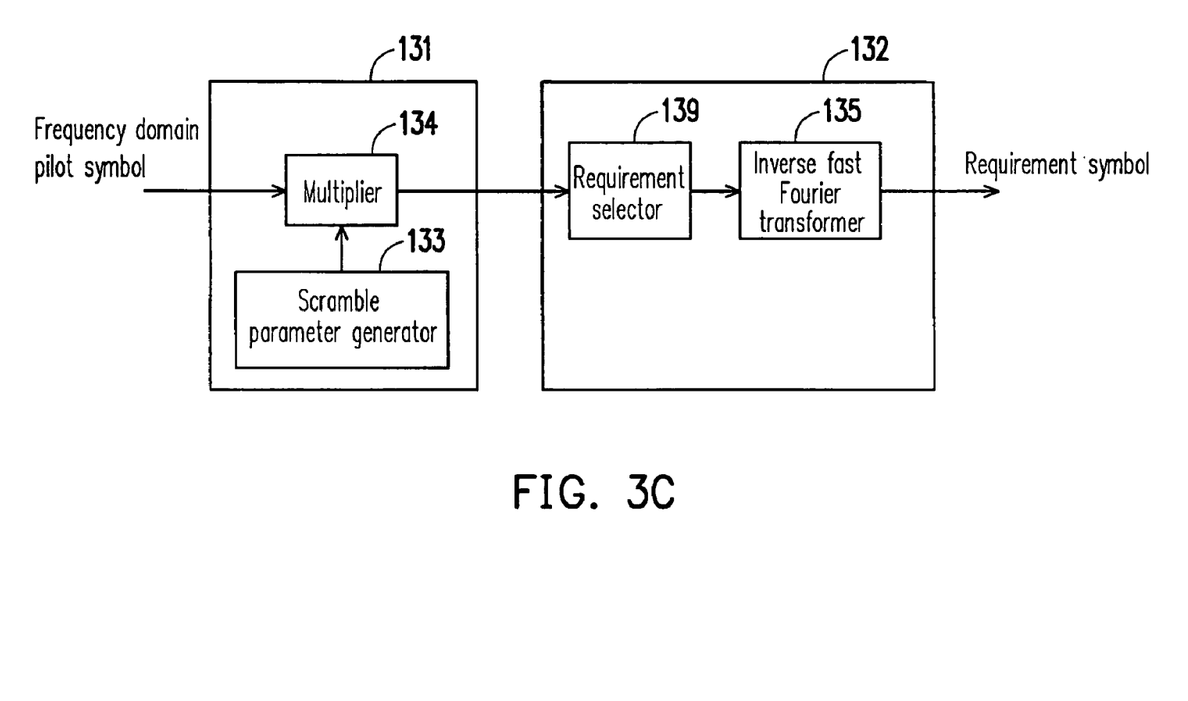
FIG. 3C is another circuit block diagram of the scrambler and the selector in FIG. 3A.

An implementation scheme of the scramble selector 130 has been illustrated above, but is not limited thereto. For example, in another embodiment (referring to FIG. 3C), the scrambler 131 generates a plurality of frequency domain scramble symbols to be output to the selector 132 after the multiplier 134 multiplies the scramble patterns generated by the scramble parameter generator 133 with the frequency domain pilot symbol. The selector 132 takes an optimal frequency domain scramble symbol selected from the plurality of frequency domain scramble symbols by the requirement selector 139 according to a particular rule as the frequency domain requirement symbol, and then, a requirement symbol is formed by the frequency domain requirement symbol through the inverse fast Fourier transformer 135, and meanwhile, the selector 132 outputs the requirement symbol to the backstage module 140. The principle for the particular rule is to select one frequency domain scramble symbol that is corresponding to a time domain scramble symbol with the minimum PAPR from the plurality of frequency domain scramble symbols. However, the implementation scheme of the particular rule is not intended to limit scope of the present invention.

Figure 4:
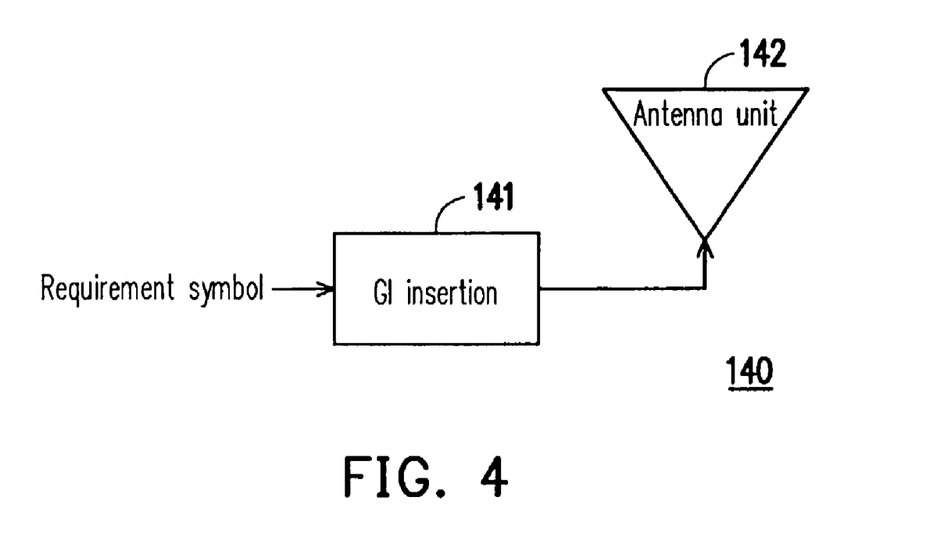
FIG. 4 is a circuit block diagram of a backstage module in FIG. 1.

Referring to FIG. 1, the backstage module 140 is coupled to the scramble selector 130 and is used for receiving the requirement symbol. Referring to FIG. 4, the backstage module includes a GI insertion 141 and an antenna unit 142. The GI insertion 141 is coupled between the selector 132 and the antenna unit 142 and is used for receiving the requirement symbol and inserting a guard interval (GI) by means of cyclic prefix in the requirement symbol. The antenna unit 142 is coupled to the GI insertion 141 and is used for transmitting the signals out of the transmitter 100 in the form of electromagnetic waves.

In addition, the plurality of scramble patterns generated by the scramble selector 130 are irrelevant to each other in the transmitters of different cells in the SFN system, but the scramble parameters in each of the scramble patterns need not be completely irrelevant, which satisfies the scramble operation as long as there is a little randomness. Moreover, the scramble selector 130 may generate the scramble patterns in a scramble mode of frequency domain or in a scramble mode of both the frequency domain and time domain, which is not intended to limit scope of the present invention. As the plurality of scramble patterns generated by the scramble selector 130 added to the transmission architecture are irrelevant to each other in the transmitters of different cells in the SFN system, the multi-cell diversity gain may be increased. Besides, one time domain scramble symbol with a relative minimum PAPR is selected to reduce the PAPR of the transmitted signal. For example, the PAPR may be reduced through the conventional partial transmit sequence (PTS) method.

Besides the above embodiment, the forestage module 110, the pilot insertion 120, the scramble selector 130, and the backstage module 140 may also be implemented through other means, for example, referring to the paper, entitled "*OFDM with Reduced Peak-to-average Power Ratio by Optimum Combination of Partial Transmit Sequences*", (Electronics Letters, vol. 33, no. 5, pp. 368-369, February 1997) issued by S. H. Muller and J. B. Huber.

It should be noted that, when being applied to an OFDM transmitter in the SFN system, the transmission architecture of this embodiment may reduce the PAPR of the transmitted signal and enhance the multi-cell diversity gain. The SFN system has plenty of cells, in which each cell at least includes a transmitter and a receiver, and the transmitter employs the transmission architecture of this embodiment. In addition, in various different cells, the scramble patterns generated by the scramble selectors in different transmitters are irrelevant to each other, which is the key point for improving the multi-cell diversity gain of the present invention.

Moreover, this embodiment is further different from the conventional transmission architecture in that, the pilot insertion 120 first inserts a pilot signal in the frequency domain data symbol to produce the frequency domain pilot symbol and then transmits the frequency domain pilot symbol to the scramble selector 130. Therefore, when the OFDM receiver in the SFN system estimates a channel response, the channel frequency response estimated through using the pilot signal also includes the effect of the scramble patterns. Accordingly, as for the OFDM system in the SFN system, there is no need to provide a side information containing the scramble pattern information to the receiver. Therefore, as for the OFDM system in the SFN system, with a transmitter adopting the transmission architecture of the present invention, the original receiver need not be changed at all.

Figure 5:
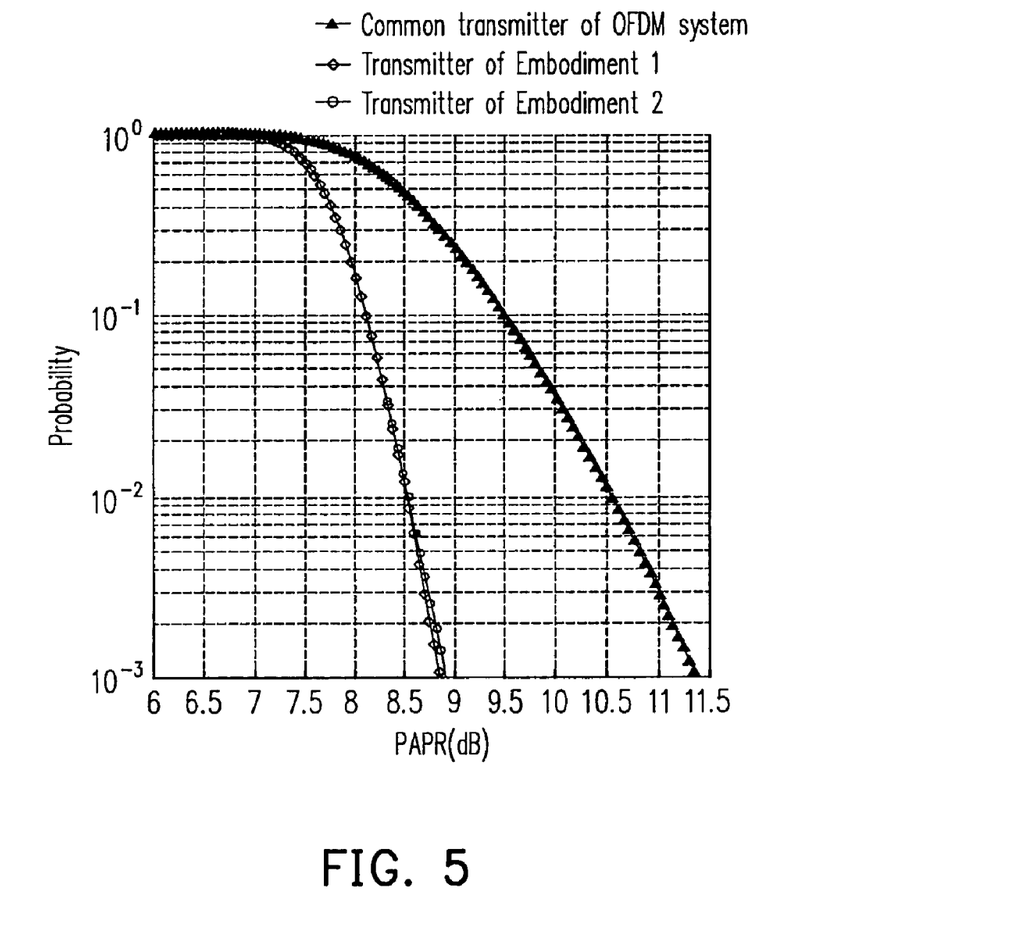
FIG. 5 shows probability results of measured PAPRs of a transmitter according to two exemplary embodiments consistent of the present invention and that of a common transmitter of an OFDM system.

FIG. 5 shows probability results of measured PAPRs of a transmitter according to two embodiments of the present invention and that of a common transmitter of an OFDM system. In FIG. 5, the horizontal axis indicates a given PAPR (dB), and the longitudinal axis indicates probability value when the PAPRs obtained through computer simulation are larger than the given PAPR. The transmitter of Embodiment 1 adopts a scramble mode of frequency domain according to the present invention, the transmitter of Embodiment 2 adopts a scramble mode of both the frequency domain and time domain according to the present invention, and the common transmitter of an OFDM system does not employ a scramble selector. As seen from FIG. 5, the probability for the transmitters of Embodiment 1 and Embodiment 2 to have a PAPR larger than 9 dB (a given PAPR) is less than 0.1%. The probability for the common transmitter of an OFDM system to have a PAPR larger than 9 dB (a given PAPR) is from 0.2 to 0.3, which is much higher than the probability of the transmitters of Embodiment 1 and Embodiment 2. Therefore, the present invention can reduce the PAPR of the transmitted signal.

Figure 6:
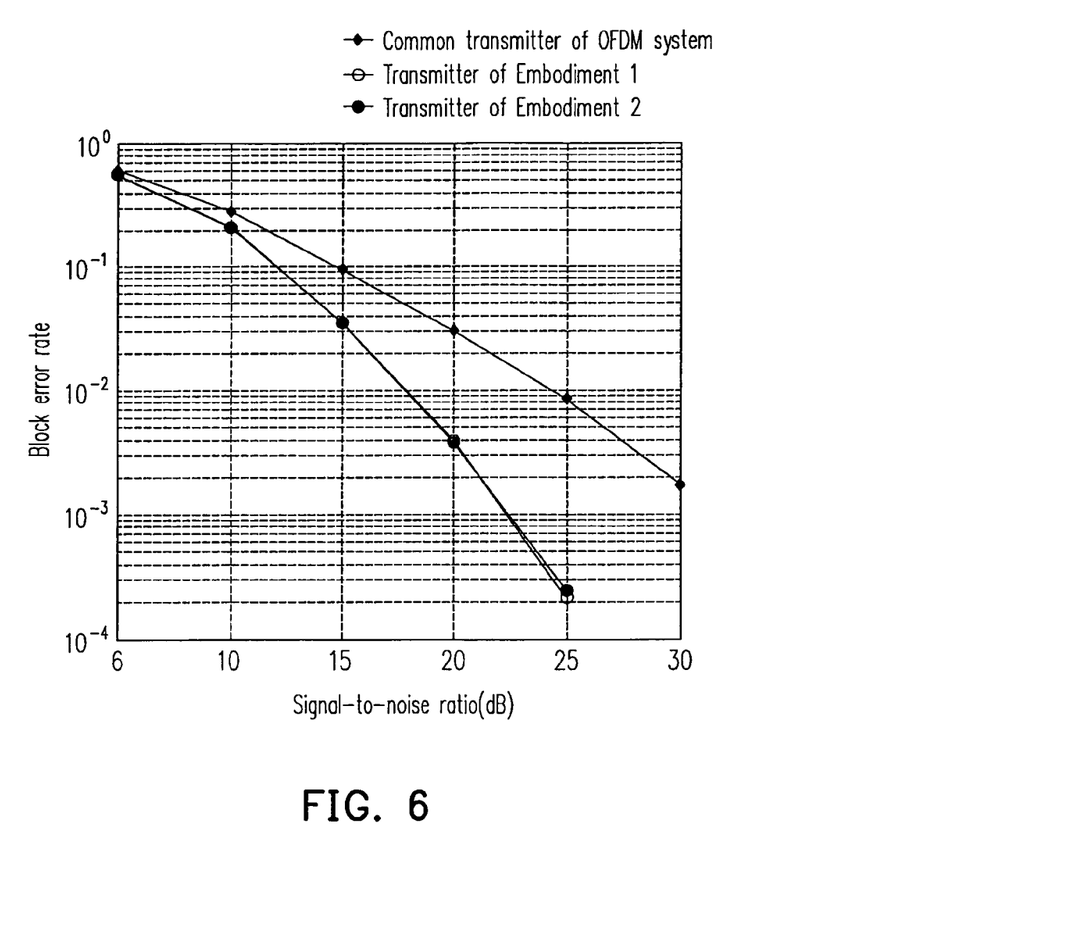
FIG. 6 shows block error rate results of measured signal-to-noise ratios of a transmitter according to two exemplary embodiments consistent of the present invention and that of a common transmitter of an OFDM system.

FIG. 6 shows block error rate results of measured signal-to-noise ratios of a transmitter according to two embodiments of the present invention and that of a common transmitter of an OFDM system. In FIG. 6, the horizontal axis indicates a given signal-to-noise power ratio (dB), and the longitudinal axis indicates the block error rate measured by the receiver at an output end of a channel decoding module through computer simulation for a given signal-to-noise power ratio (the channel is a combined channel of two single-path channels). Generally, it is interesting to know the value (dB) of the signal-to-noise power ratio that is needed when the block error rate reaches 1%. The transmitter of Embodiment 1 adopts a scramble mode of frequency domain according to the present invention, the transmitter of Embodiment 2 adopts a scramble mode of both the frequency domain and time domain according to the present invention, and the common transmitter of an OFDM system does not employ a scramble selector. As seen from FIG. 6, when the block error rates of the transmitters of Embodiment 1 and Embodiment 2 reach 1%, the required signal-to-noise ratio is only about 17.5 dB, and when the block error rate of the common transmitter of an OFDM system reaches 1%, the required signal-to-noise ratio rises to about 24 dB. Therefore, the present invention can increase the multi-cell diversity gain.

In view of the above, the transmitter according to an embodiment of the present invention is suitable for being used in an OFDM system of the SFN system, for reducing the PAPRs of the transmitted signals and increasing the multi-cell diversity gain, and the original receiver does not need to be changed at all.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmission architecture of a transmitter, for reducing Peak to Average Power Ratio (PAPR) of the transmitted signals and increasing multi-cell diversity gain without requiring descramble operation in a corresponding receiver, the architecture comprising:

a forestage module transmitting a frequency domain data symbol;

a pilot insertion, connected to the forestage module, receiving the frequency domain data symbol, and inserting a pilot signal in the frequency domain data symbol to produce a frequency domain pilot symbol, so as to only estimate the channel effect;

a scramble selector, connected to the pilot insertion, generating a plurality of scramble patterns for every frequency domain pilot symbol so as to perform a scramble operation with the frequency domain pilot symbol, and then performing a select operation from among the plurality of scrambled frequency domain pilot symbols to select a scrambled frequency domain pilot symbol with minimum PAPR to produce a requirement symbol, wherein the plurality of the scramble patterns generated by the scramble selector are irrelevant to each other, but a part of the scramble parameters in each of the scramble patterns are relevant to one another as long as there is a little randomness; and a backstage module, connected to the scramble selector, for processing and transmitting the requirement symbol out of the transmitter so as to provide a corresponding receiver with the transmitted requirement symbol which can be recovered by the receiver without any corresponding descramble operation.

2. The transmission architecture of a transmitter according to claim 1, wherein the forestage module comprises:

a data source bit stream generator, for generating a frequency domain data bit stream to be transmitted;

a channel encoder, coupled to the data source bit stream generator, for receiving the frequency domain data bit stream, and performing channel encoding on the frequency domain data bit stream to produce an encoded frequency domain data bit stream;

an interleaver, coupled to the channel encoder, for interleaving the encoded frequency domain data bit stream to produce an interleaved encoded frequency domain data bit stream; and a mapper, coupled between the interleaver and the pilot insertion, for mapping the interleaved encoded frequency domain data bit stream into the frequency domain data symbol, and transmitting the frequency domain data symbol to the pilot insertion.

3. The transmission architecture of a transmitter according to claim 1, wherein the backstage module comprises:

a guard interval (GI) insertion, coupled to the scramble selector, for receiving the requirement symbol, and inserting a guard interval (GI) into the requirement symbol; and an antenna unit, coupled to the GI insertion, for transmitting the requirement symbol with the GI out of the transmitter in the form of electromagnetic waves.

4. The transmission architecture of a transmitter according to claim 1, wherein the scramble selector comprises:

a scrambler, coupled to the pilot insertion, for generating the scramble patterns, and performing the scramble operation between the scramble patterns and the frequency domain pilot symbol to produce a plurality of time domain scramble symbols; and a selector, coupled between the scrambler and the backstage module, for performing the select operation to select one of the time domain scramble symbols outputted from the scrambler to produce the requirement symbol, and then transmitting the requirement symbol to the backstage module.

5. The transmission architecture of a transmitter according to claim 4, wherein the scrambler comprises:

a scramble parameter generator, for generating the scramble patterns;

a multiplier, coupled to the scramble parameter generator and the pilot insertion, for multiplying the scramble patterns with the frequency domain pilot symbol, so as to produce a plurality of frequency domain scramble symbols; and an inverse fast Fourier transformer, coupled to the multiplier, for converting the frequency domain scramble symbols into the time domain scramble symbols.

6. The transmission architecture of a transmitter according to claim 4, wherein the selector comprises:

a peak-to-average power ratio (PAPR) calculator, coupled to the scrambler, for calculating and then outputting the PAPRs of the time domain scramble symbols;

a minimum selector, coupled to the PAPR calculator, for selecting and then outputting an index number of a scramble pattern with a relative minimum PAPR according to the output values of the PAPR calculator; and a switch, coupled between the scrambler, the minimum selector, and the backstage module, for receiving the time domain scramble symbols, then selecting one of the time domain scramble symbols as the requirement symbol according to the index number of the scramble pattern from the output of the minimum selector, and then transmitting the requirement symbol to the backstage module.

7. The transmission architecture of a transmitter according to claim 4, wherein the scramble operation comprises multiplying the frequency domain pilot symbol with the scramble patterns and then performing an inverse fast Fourier transformation operation.

8. The transmission architecture of a transmitter according to claim 1, wherein the scramble selector comprises:

a scrambler, coupled to the pilot insertion, for generating the scramble patterns, and performing the scramble operation between the scramble patterns and the frequency domain pilot symbol to produce a plurality of frequency domain scramble symbols; and a selector, coupled to the scrambler and the backstage module, for selecting one of the frequency domain scramble symbols outputted from the scrambler as a frequency domain requirement symbol, and performing an inverse fast Fourier transformation operation to form the requirement symbol for being output to the backstage module.

9. The transmission architecture of a transmitter according to claim 8, wherein the scrambler comprises:

a scramble parameter generator, for generating the scramble patterns; and a multiplier, coupled to the scramble parameter generator and the pilot insertion, for multiplying the scramble patterns with the frequency domain pilot symbol, so as to produce the frequency domain scramble symbols.

10. The transmission architecture of a transmitter according to claim 8, wherein the selector comprises:

a requirement selector, coupled to the scrambler, for selecting one of the frequency domain scramble symbols as the frequency domain requirement symbol; and an inverse fast Fourier transformer, coupled between the requirement selector and the backstage module, for performing the inverse fast Fourier transformation operation to convert the frequency domain requirement symbol into the requirement symbol.

11. The transmission architecture of a transmitter according to claim 8, wherein the scramble operation comprises multiplying the frequency domain pilot symbol with the scramble patterns.

12. The transmission architecture of a transmitter according to claim 4, wherein the select operation comprises selecting one time domain scramble symbol with a relative minimum PAPR from the time domain scramble symbols to serve as the requirement symbol.

13. The transmission architecture of a transmitter according to claim 1, wherein the scramble patterns generated by the scramble selector are irrelevant to each other.

14. The transmission architecture of a transmitter according to claim 1, wherein the scramble operation comprises a scramble mode of frequency domain.

15. The transmission architecture of a transmitter according to claim 1, wherein the scramble operation comprises a scramble mode of both the frequency domain and time domain.

16. The transmission architecture of a transmitter according to claim 1, wherein the transmitter is an orthogonal frequency division multiplexing (OFDM) transmitter.

17. The transmission architecture of a transmitter according to claim 16, wherein the OFDM transmitter is applied in a single frequency network (SFN) system.

18. The transmission architecture of a transmitter according to claim 17, wherein the scramble patterns generated by the scramble selectors in the transmitters of different cells in the SFN system are irrelevant to each other.

* * * * *